April 6, 1965 H. T. SPARROW 3,176,703

PULSED FLUID AMPLIFIER

Filed March 1, 1962

INVENTOR.
HUBERT T. SPARROW
BY Alfred N. Feldman
ATTORNEY

United States Patent Office 3,176,703
Patented Apr. 6, 1965

3,176,703
PULSED FLUID AMPLIFIER

Hubert T. Sparrow, Edina, Minn., assignor to Honeywell Inc., a corporation of Delaware
Filed Mar. 1, 1962, Ser. No. 176,631
7 Claims. (Cl. 137—81.5)

The present invention is directed to a type of fluid amplifier that utilizes control jets for shifting a main fluid stream between two or more outlets. More specifically, the present invention is directed to the utilization of variable volume chambers to seal the control jet passages thereby providing a means of obtaining fluid pulses from the central or main fluid stream without the addition of, or control of, separate fluid sources to the fluid amplifier.

The principles of the basic types of fluid amplifiers have become quite well known in the art since their introduction in early 1960. Much of the work was accomplished at the Diamond Ordnance Fuze Laboratory. The work accomplished on fluid amplifiers has been published extensively in periodicals and technical journals and recently patents disclosing this type of device have issued. Two patents which disclose various improvements in fluid amplifier devices and which further disclose fluid amplifier principles in substantial detail, issued on September 26, 1961. It is believed that a consideration of the introductory material in these two patents will clearly establish the background of fluid amplifiers per se and the amplifiers therefore will not be discussed in great detail in the present specification. The two patents that issued on September 26, 1961, are No. 3,001,539 to H. Hurvitz and No. 3,001,698 to R. W. Warren. As was mentioned, the introductory parts of the cited patents establish extensively the background of fluid amplifiers generally, and the present invention is an improvement in this field of endeavor.

In the present invention, a fluid amplifier is provided in which a main fluid inlet means is supplied with a fluid that is to be controlled. The fluid flow passes through a restriction to form a jet and then passes to an outlet means. The outlet means is most commonly made up of two fluid flow passages, each one of which is normally capable of handling the entire fluid flow through the device. Adjacent to the inlet jet are normally a pair of opposed openings that are supplied with fluid. The fluid supplied to the control fluid openings shifts the fluid flow stream between the outlet passages of the outlet means thereby obtaining control of the device. The unit is referred to as an amplifier since the control jet supplied at the side of the main jet is substantially smaller in volume and power than the main stream which is controlled. The present invention is an improvement in this type of a unit wherein each of the control fluid inlets is sealed by a variable volume chamber. The variable volume chambers fill with the fluid passing through the unit and are used to provide pulses of fluid so as to obtain the necessary jets to switch the amplifier from one outlet to another. The variable volume chambers can be constructed in various fashions, as will be described in detail in the present application, and they can be operated in a differential fashion or independently of one another. The operation of the variable volume chambers to produce a jet of fluid provides the novel control feature of the present application.

It is a primary object of the invention to disclose a fluid amplifier control device that utilizes at least one variable volume chamber to seal the control port for the amplifier, and which chamber is used to provide a jet or pulse of fluid to switch the amplifier.

It is a further object of the present invention to disclose a fluid amplifier that utilizes either a single control jet or a differential control jet to shift the amplifiers operation.

Yet another object of the present invention is to disclose a fluid amplifier that is capable of being controlled by any number of movable means without the need to valve or control a fluid in and of itself.

Still a further object of the present invention is to obtain a valving mechanism for a fluid amplifier which does not require any movable seals between the fluid and the atmosphere.

A further object of the present invention is to disclose a unique type of fluid amplifier wherein the static or head pressure is balanced out within the unit and all of the work is accomplished within a single fluid flow system.

These and other objects will become apparent when the present specification is considered with the drawing, wherein.

Figures 1, 2, 3, 4, 5:
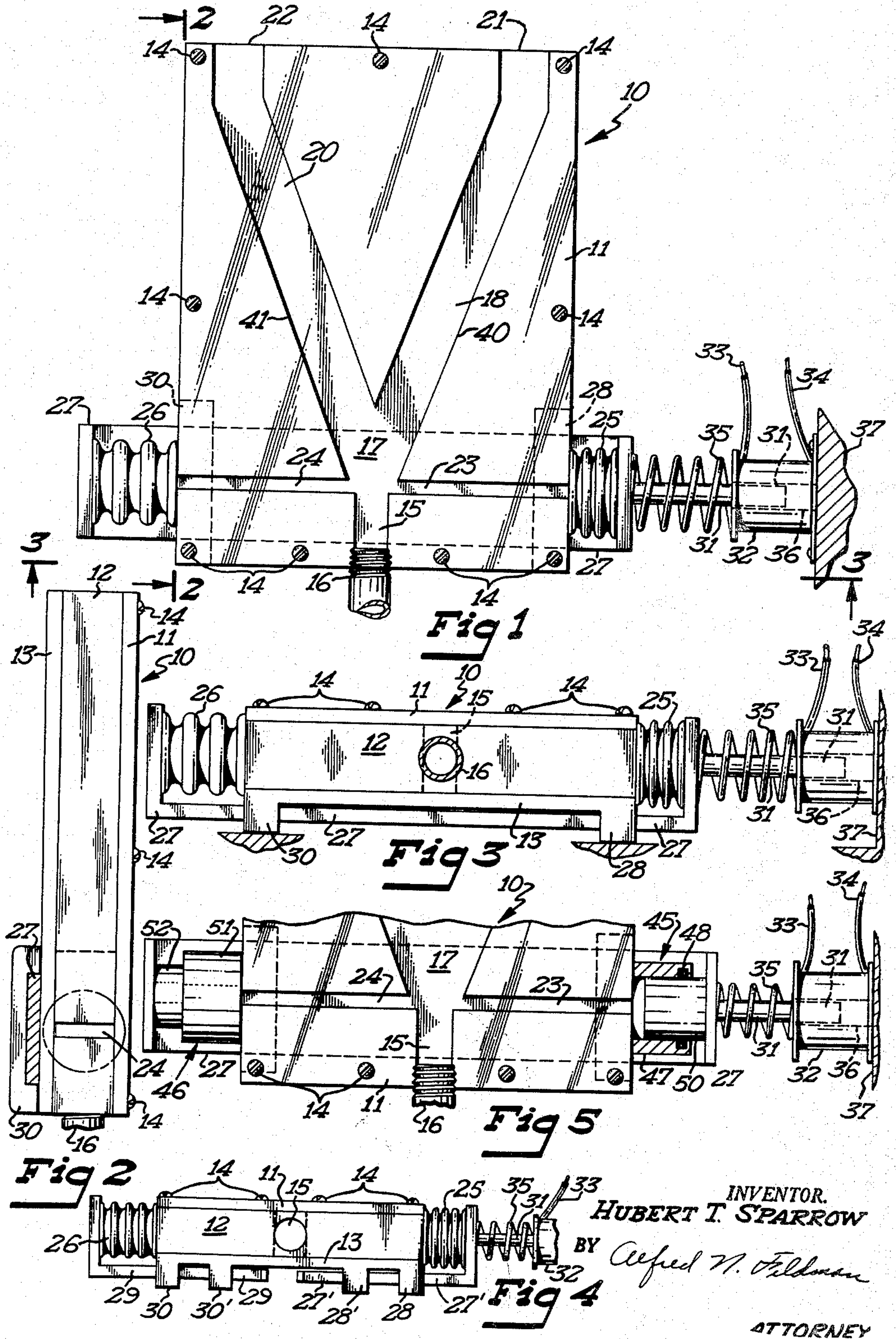
FIGURE 1 is a top view of a fluid amplifier utilizing the present principle and being pulsed by an electromagnetic solenoid which is attached to a pair of differentially moved bellows.
FIGURE 2 is a side view along lines 2—2 of FIGURE 1.
FIGURE 3 is an end view of the device in FIGURE 1 taken along the lines 3—3 of FIGURE 1.
FIGURE 4 is a modified version in which the differential arrangement is replaced by a single operating solenoid.
FIGURE 5 is a partial top view of a fluid amplifier similar to FIGURE 1, but which is operated by means of a piston arrangement.

In FIGURES 1, 2, and 3, three views of a pulsed fluid amplifier are generally shown at 10. The amplifier is built up in a substantially conventional form of three laminated members 11, 12, and 13. The laminated member 11 is transparent and in FIGURE 1 discloses the fluid passages that are provided in the center laminated member 12. The bottom plate or laminated member 13 can be of any convenient type. The laminated members 11, 12, and 13 are held in a fluid tight assembly by a plurality of screw members 14.

The center plate 12 has a number of fluid passages formed therein and in the present disclosure these passages are all substantially rectangular in cross section. The fluid amplifier 10 has provided in plate 12 an inlet passage or means 15 that is supplied by a threaded pipe 16. The inlet means 15 flows into a fluid outlet means 17 that includes two passages 18 and 20. The two passages 18 and 20 have openings 21 and 22, respectively. The outlet passages 21 and 22 can be connected by any fluid tight means through one or more fluid loads (not shown) into which the fluid amplifier 10 is required to work. The only requirements on the load or loads placed between the outlets 21 and 22 are that continuous fluid flow is possible and that the joints are substantially fluid tight in nature, as is common in the present type of fluid amplifier device.

The outlet means is controlled by a pair of control fluid means or passages 23 and 24, that are rectangular passages at right angles to the inlet means 15. The passages 23 and 24 are capable of supplying pulses of fluid in jet form to switch the fluid amplifier in conventional fluid amplifier operation. The means of supplying the fluid for these jets will be described subsequently in the present discussion. The control fluid means or passage 23 is sealed by a bellows 25, while the control fluid means or passage 24 is sealed by a bellows 26. The bellows 25 and 26 form variable volume chamber means. The two bellows 24 and 25 are tied together by a U-shaped bracket 27 that passes through a pair of slide supports 28 and 30. The bracket 27 and the supports 28 and 30 cause the bellows 25 and 26 to vary in volume in a differential fashion. Whenever the bellows 25 is caused to be reduced in volume the bellows 26 increases in volume, and vice versa.

The bracket 27 is connected to a magnetic plunger 31 that passes into a solenoid 32 that can be energized by way of conductors 33 and 34. A spring 35 is placed between the solenoid 32 and the bracket 27 and establishes a fixed position for the bracket 27 when the solenoid 32 is not energized. When the solenoid 32 is energized, the plunger 31 moves in the hole 36 causing the bracket 27 to move to the right thereby compressing the spring 35. The solenoid 32 is mounted on any convenient means 37 and thereby provides an operating base for the solenoid 32.

The operation of the present fluid amplifier follows much of the teaching of the fluid amplifier art that has become widely known. The operation will be briefly described along with the novel features of the present invention. A fluid is supplied to pipe 16 under pressure. The fluid is normally regulated so that the pressure remains constant and the means of regulating the fluid forms no part of the present invention. It is further understood that the term fluid incorporates any type of material that can be forced to flow under pressure including gases, liquids, mixtures of liquids and gases, and the mixture of semi-solid materials in other materials such as liquids. The only restriction is that the fluid be capable of movement under a pressure differential. If the present device is considered to be operating on a fluid such as water, its operation can be readily understood. If the fluid or water is supplied to pipe 16, the outlet means 17 and the passages 18 and 20 become filled with fluid. At the same time the passages 23 and 24 along with the bellows 25 and 26 fill with fluid during the initial operation of the device. When the device has been completely filled with fluid and is ready for operation, the function is substantially as follows. As fluid flows from pipe 16 into the outlet means 17, the flow will lock to one side or the other. In order to obtain initial control of the unit, the solenoid 32 is energized by applying power to conductors 33 and 34. The energization of the solenoid 32 causes the plunger 31 to move to the right thereby moving the bracket 27 to the right. This movement compresses the spring 31 and decreases the volume of the bellows 26 while differentially increasing the volume of the bellows 25. The shift of the bracket 27 and the resultant change in volume of the bellows 25 and 26 causes a pulse of fluid to be directed out of the control fluid means 24 against the side of the fluid flow issuing from the inlet means 15. This pulse of fluid shifts the entire stream of fluid from the inlet means to the channel 18 of the outlet means 17. Once the fluid shifts to channel 18 it remains in channel 18 as is understood in connection with fluid amplifiers. This tendency to remain in channel 18 is due to the lockon tendency of the fluid flow along the right-hand wall 40 of the channel 18. A pressure differential across the fluid flow is established to hold the fluid flow in channel 18 as is taught in the prior fluid amplifier art.

When it becomes desirable to shift the fluid flow from channel 18 into channel 20, it is merely necessary to deenergize the solenoid 32. Upon de-energizing the solenoid 32, the compressed spring 35 shifts the bellows to the position shown in FIGURE 1 and a pulse of fluid issues from the control fluid means 23 against the side of the fluid flow from the inlet means 15. This pulse of fluid breaks the lockon of the fluid flow in channel 18 from the wall 40 and shifts the entire fluid over to channel 20 wherein the fluid attaches to wall 41. The fluid flow then remains in channel 20 until the sequence is repeated. The bellows 25 and 26 in each case obtain their fluid from the fluid inlet means 15 through the initial filling of the device and the subsequent shifting picks up the necessary fluid without disturbing the main operation of the unit.

In FIGURE 4, there is disclosed a modification of the device disclosed in FIGURES 1, 2, and 3. The device disclosed in FIGURE 4 is identical to that of FIGURES 1, 2, and 3 with the exception that bracket 27 of FIGURE 1 is now cut to form two brackets 27' and 29. The brackets 27' and 29 are supported by second support means 30' and 28' so that the bracket 27' can be slide freely along with the operation of the bellows 25. The operation is completely independent of the bellows 26 and of the bracket 29. Since the two bellows 25 and 26 are not directly tied together in FIGURE 4, as in FIGURE 1, their operation is very slightly different even though the over-all operation of the fluid amplifier device is substantially unchanged. Upon the bellows 25 being moved by the solenoid 32, the pulse of fluid in the control fluid means again results. The bellows 26 then shifts to take up any pressure change that takes place in the control fluid means 24. It thus becomes apparent that in the operation of the device in FIGURE 4, the shift of the bellows 25 provides an outlet jet when shifting the device away from the bellows 25 and creates an inlet or suction of fluid when the device is shifted towards the bellows 25. The second bellows 26 shifts in a substantially differential fashion even though it is not directly connected to the bellows 25 by the bracket. The pulse control of the amplifier is obtained by the fact that a jet of fluid is either caused to flow from the control fluid means 23 or is caused by suction of fluid into the control fluid means 23. When the suction into the control fluid means 23 occurs, the bellows 26 collapses and creates a jet from the control fluid means 24 to provide the necessary pressure shift to control the device.

In FIGURE 5, a fluid amplifier device 10 is again shown and is substantially identical to the device disclosed in FIGURE 1. The difference between the unit disclosed in FIGURE 5 and in FIGURE 1 is that the bellows 25 and 26 have been replaced by piston means 45 and 46. The piston means 45 is formed of a fixed wall 47 having a sealing means 48 and a piston 50 that is mounted on bracket 27. The structure of the piston means 46 is identical in that a fixed wall 51 is provided having sealing means (not shown) and a piston 52 that is attached to bracket 27. It is apparent that the function of the wall and piston in each case of the piston means 45 and 46 is to provide variable volume chamber means in the same fashion as it is provided by the bellows 25 and 26. The operation of the device in FIGURE 5 is identical to that of FIGURE 1 and will not be repeated. It is obvious that any type of variable volume chamber means can be used with the present device, such as the bellows, piston, or other means such as a diaphragm seal. The operation of the present device revolves about the fact that the sealed chambers are provided at opposite sides of the unit thereby providing the pulse control jets for switching the amplifier means 10. The means of sealing the control fluid means in a variable fashion is not material to the present invention and has been disclosed in two forms as means of an example only.

The present invention is directed to the operation of a fluid amplifier having a single fluid inlet and having the control fluid means sealed and obtaining their fluid from the single inlet. The means for carrying out this invention has been disclosed in various embodiments and these embodiments are illustrative only of a few of the many possible variations in the present invention. Since the present invention can be carried out in many physical forms, the applicant wishes to be limited in the scope of his invention only by the scope of the appended claims.

I claim as my invention:

1. A fluid amplifier control device, including: fluid inlet means supplied with a fluid to be controlled; fluid flow outlet means; control fluid means adjacent said inlet means and including an opening at one end of said control fluid means directed toward said inlet fluid flow; said control fluid means being sealed at an end opposite said opening by variable volume chamber means; and movable means to vary said variable volume chamber means to create an output of fluid from said opening to control the direction of fluid flow in said outlet means.

2. A fluid amplifier control device, including: fluid inlet means supplied with a fluid to be controlled; fluid flow outlet means; control fluid means adjacent opposite sides of said inlet means, and each control means including an opening at one end of said control fluid means directed toward said inlet fluid flow; said control fluid means each being sealed at an end opposite said opening by variable volume chamber means; and movable means to vary at least one of said variable volume chamber means to create an output of fluid from one said opening to control the direction of fluid flow in said outlet means.

3. A fluid amplifier control device, including: fluid inlet means supplied with a fluid to be controlled; fluid flow outlet means; control fluid means adjacent opposite sides of said inlet means, and each control means including an opening at one end of said control fluid means directed toward said inlet fluid flow; said control fluid means each being sealed at an end opposite said opening by variable volume chamber means; and movable means to differentially vary said variable volume chamber means to create an output of fluid from one said opening and to cause an intake in said other opening to control the direction of fluid flow in said outlet means.

4. A fluid amplifier control device, including: a fluid inlet continuously supplied with a fluid to be controlled; fluid flow outlet means having two branches each capable of handling the total fluid flow in said device; control fluid means adjacent said inlet means and including an opening at one end of said control fluid means directed toward said inlet fluid flow; said control fluid means being sealed at an end opposite said opening by variable volume chamber means; and movable means to vary said variable volume chamber means to create an output jet of fluid from said opening to control the direction of fluid flow in said outlet means between said branches.

5. A fluid amplifier control device, including: fluid inlet means supplied with a fluid to be controlled; fluid flow outlet means; control fluid means adjacent said inlet means and including an opening at one end of said control fluid means directed toward said inlet fluid flow; said control fluid means being sealed at an end opposite said opening by a bellows to form a variable volume chamber; and electromagnetic movable means to vary said bellows thereby causing said variable volume chamber to create an output of fluid from said opening to control the direction of fluid flow in said outlet means.

6. A fluid amplifier control device, including: fluid inlet means supplied with a fluid to be controlled; fluid flow outlet means; control fluid means adjacent opposite sides of said inlet means, and each control means including an opening at one end of said control fluid means directed toward said inlet fluid flow; said control fluid means each being sealed at an end opposite said opening by a bellows to form a variable volume chamber; and electromagnetic movable means to differentially vary said bellows to create an output of fluid from one said opening and to cause an intake in said other opening to control the direction of fluid flow in said outlet means.

7. A fluid amplifier control device, including: fluid inlet means supplied with a fluid to be controlled; fluid flow outlet means; control fluid means adjacent said inlet means and including an opening at one end of said control fluid means directed toward said inlet fluid flow; said control fluid means being sealed at an end opposite said opening by a piston to form variable volume chamber means; and movable means to vary said piston thereby causing said variable volume chamber means to create an output of fluid from said opening to control the direction of fluid flow in said outlet means.

References Cited by the Examiner

UNITED STATES PATENTS

| | | | |
|---|---|---|---|
| 1,302,538 | 5/19 | Gulick | 137—413 |
| 1,585,732 | 5/26 | Otto et al. | 251—61 |
| 2,915,079 | 1/59 | Harrison | 137—86 |
| 3,001,539 | 9/61 | Hurvitz. | |
| 3,030,979 | 4/62 | Reilly. | |
| 3,072,147 | 1/63 | Allen et al. | 137—597 |
| 3,144,037 | 8/64 | Cargill et al. | 137—81.5 |

LAVERNE D. GEIGER, *Primary Examiner.*

ISADOR WEIL, *Examiner.*